United States Patent
Hoffman et al.

(10) Patent No.: US 9,679,229 B2
(45) Date of Patent: Jun. 13, 2017

(54) CREDENTIAL PRODUCTION DEVICE CARD SUBSTRATE ROTATOR

(71) Applicant: Assa Abloy AB, Stockholm (SE)

(72) Inventors: Ted M. Hoffman, Eden Prairie, MN (US); John P. Skoglund, Minneapolis, MN (US)

(73) Assignee: Assa Abloy AB, Stockholm (SE)

( * ) Notice: Subject to any disclaimer, the term of this patent is extended or adjusted under 35 U.S.C. 154(b) by 0 days.

(21) Appl. No.: 14/865,596

(22) Filed: Sep. 25, 2015

(65) Prior Publication Data

US 2017/0087819 A1   Mar. 30, 2017

(51) Int. Cl.
| | | |
|---|---|---|
| G06K 15/02 | (2006.01) | |
| B41F 19/00 | (2006.01) | |
| B65G 47/244 | (2006.01) | |
| B41F 23/00 | (2006.01) | |

(52) U.S. Cl.
CPC .......... *G06K 15/021* (2013.01); *B41F 19/001* (2013.01); *B41F 23/00* (2013.01); *B65G 47/244* (2013.01)

(58) Field of Classification Search
CPC ...... B41F 19/001; B41F 23/00; B65G 47/244; B41J 11/0055
See application file for complete search history.

(56) References Cited

U.S. PATENT DOCUMENTS

| | | |
|---|---|---|
| 3,758,104 A | 9/1973 | Daily |
| 3,847,273 A | 11/1974 | Buhayar |
| 4,015,724 A | 4/1977 | Spencer |
| 6,173,828 B1 | 1/2001 | Leu et al. |
| 6,343,686 B1 | 2/2002 | Whiting et al. |
| 6,811,152 B2 | 11/2004 | Delfosse et al. |
| 7,870,824 B2 | 1/2011 | Helma et al. |
| 2007/0099462 A1 | 5/2007 | Helma et al. |
| 2008/0068432 A1 | 3/2008 | Sohn et al. |
| 2008/0124163 A1* | 5/2008 | Morimoto ............ B41J 11/0055 400/630 |
| 2010/0090395 A1 | 4/2010 | Lewalski et al. |
| 2011/0132722 A1 | 6/2011 | Depoi et al. |
| 2012/0177474 A1 | 7/2012 | Meier et al. |

FOREIGN PATENT DOCUMENTS

| | | |
|---|---|---|
| CH | 637900 A5 | 6/1979 |
| DE | 10219569 A1 | 11/2003 |
| EP | 0846639 B1 | 9/2002 |
| FR | 1555892 | 12/1966 |
| JP | 60258037 | 12/1985 |

OTHER PUBLICATIONS

Extended European Search Report for corresponding European application No. 16190161.6 dated Feb. 17, 2017.

\* cited by examiner

*Primary Examiner* — Justin Seo
(74) *Attorney, Agent, or Firm* — Brian D. Kaul; Westman, Champlin & Koehler, P.A.

(57) ABSTRACT

Some embodiments of a card rotator include a card receptacle, a feed roller, and a motor. The card receptacle is configured to rotate about a pivot access that is approximately perpendicular to a plane of a card substrate supported by the card receptacle. The feed roller is configured to discharge a card substrate from the card receptacle. The feed roller has an axis of rotation that is approximately perpendicular to the pivot axis. The motor is configured to drive rotation of the card receptacle about the pivot axis relative to the axis of rotation of the feed roller.

19 Claims, 8 Drawing Sheets

CREDENTIAL PRODUCTION DEVICE CARD SUBSTRATE ROTATOR

BACKGROUND

Credentials include identification cards, driver's licenses, passports, and other documents. Such credentials are formed from credential or card substrates including paper substrates, plastic substrates, cards, and other materials. Such credentials generally include printed information, such as a photo, account numbers, identification numbers, and other personal information. Credentials can also include data that is encoded in a smartcard chip, a magnetic stripe, or a barcode, for example.

Credential production devices include processing devices that process credential substrates by performing at least one processing step in forming a final credential product using a processing device. Such processes generally include a printing process, a laminating or transfer process, a data reading process, a data writing process, and/or other process used to form the desired credential.

SUMMARY OF ILLUSTRATIVE EMBODIMENTS

Embodiments of the invention are directed to a card rotator for use in a credential production device, a method of rotating a card substrate using the card rotator, and a credential production device comprising the card rotator. In some embodiments, the card rotator includes a card receptacle, a feed roller, and a motor. The card receptacle is configured to rotate about a pivot access that is approximately perpendicular to a plane of a card substrate supported by the card receptacle. The feed roller is configured to discharge a card substrate from the card receptacle. The feed roller has an axis of rotation that is approximately perpendicular to the pivot axis. The motor is configured to drive rotation of the card receptacle about the pivot axis relative to the axis of rotation of the feed roller.

Some embodiments of the method of rotating a card substrate utilize a card rotator that includes a card receptacle, a feed roller, and a motor. In some embodiments, the card substrate is supported in the card receptacle. The card receptacle and the card substrate are rotated about a pivot axis relative to an axis of rotation of the feed roller using the motor. The pivot axis is approximately perpendicular to the axis of rotation and a plane of the card substrate. The card substrate is discharged from the card receptacle along a processing axis using the feed roller.

Some embodiments of the credential production device include a supply of card substrates, a transport mechanism configured to feed individual substrates from the supply along a processing axis, a card processing device configured to perform a process on individual card substrates fed along the processing axis, and a card rotator. In some embodiments, the card rotator includes a card receptacle, a feed roller, and a motor. In some embodiments, the card receptacle is configured to support a card substrate and rotate about a pivot axis that is approximately perpendicular to a plane of the card substrate and the processing axis. The feed roller is configured to discharge a card substrate from the card receptacle, and has an axis of rotation that is approximately perpendicular to the pivot axis and the processing axis. The motor is configured to drive rotation of the card receptacle about the pivot axis relative to the axis of rotation of the feed roller.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
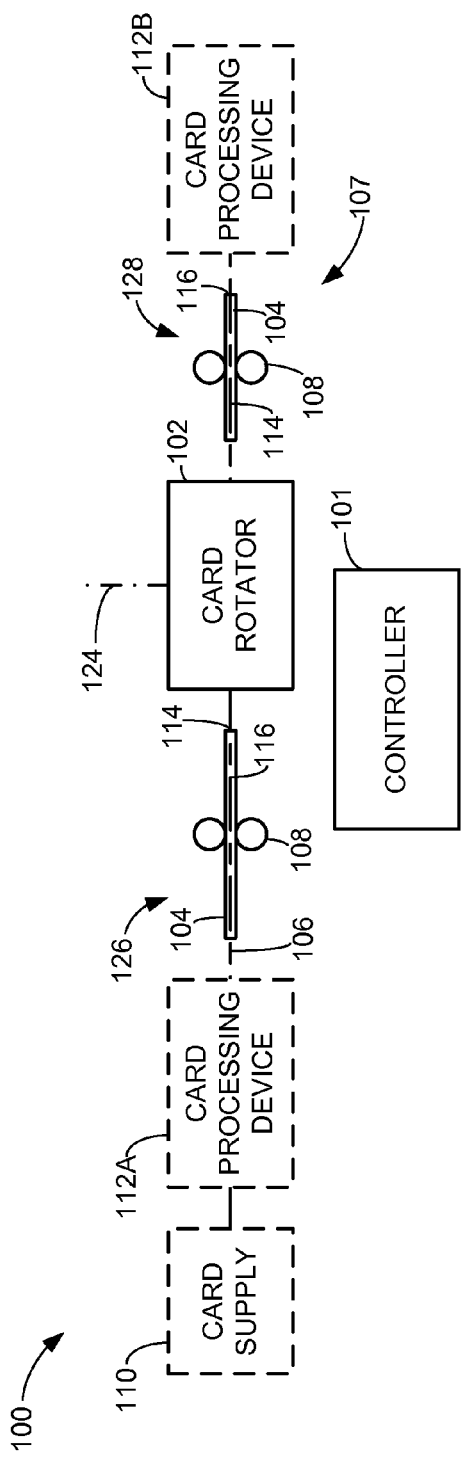
FIG. 1 is a simplified block diagram of an exemplary credential production device 100, in accordance with embodiments of the invention.

Embodiments of the invention are described more fully hereinafter with reference to the accompanying drawings. Elements that are identified using the same or similar reference characters refer to the same or similar elements. Some elements may be referred generally by a reference number and more specifically by the reference number followed by a letter and/or other reference character. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present invention may be embodied as methods, systems, devices, and/or computer program products, for example. The computer program or software aspect of the present invention may comprise computer readable instructions or code stored in a computer readable medium or memory. Execution of the program instructions by one or more processors (e.g., central processing unit) results in the one or more processors performing one or more functions or method steps described herein. Any suitable patent subject matter eligible computer readable media or memory may be utilized including, for example, hard disks, CD-ROMs, optical storage devices, or magnetic storage devices. Such computer readable media or memory do not include transitory waves or signals.

The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 is a simplified block diagram of an exemplary credential production device 100, in accordance with embodiments of the invention. In some embodiments, the device 100 includes a controller 101 representing one or more processors that are configured to execute program instructions stored in memory of the device 100 or other location. The execution of the instructions by the controller 101 controls components of the device 100 to perform functions and method steps described herein.

In some embodiments, the device 100 includes a card rotator 102 that is configured to rotate a card substrate 104 approximately 90 degrees relative to a processing axis 106. In some embodiments, individual substrates 104 are fed along the processing axis 106 using a transport mechanism 107 that may comprise feed rollers 108, or other conventional card feeding components. In some embodiments, the device 100 includes a card supply 110, which can contain multiple substrates 104 for feeding along the processing axis 106 using the transport mechanism 107. In some embodiments, the card supply 110 may be replaced with a card input, through which individual substrates are supplied for feeding along the processing axis 106 from a user or another substrate processing module of the system 100. In some embodiments, card substrates are only fed along the processing axis 106 through the card rotator 102, but may follow a non-linear path outside the card rotator 102.

In some embodiments, the device 100 includes at least one card processing device, generally referred to as 112, such as card processing device 112A and/or card processing device 112B, as shown in FIG. 1. The card processing devices 112 are generally configured to perform a process on the substrate 104. As mentioned above, such processes may include a printing process, a laminating or transfer process, a data reading process, a data writing process, and/or other processes that may be used to transform the card substrate 104 into the desired credential product.

In some embodiments, the card processing device 112A is a printing device that is configured to perform a printing process. In some embodiments, the printing device includes a print head, such as a thermal print head, an ink jet print head, or other suitable print head. In some embodiments, the printing device 112A is configured to perform a direct printing process, in which an image is printed directly to a surface of the substrate 104. In some embodiments, the printing device is configured to perform a portion of a transfer printing process, during which an image is printed to a print intermediate, in accordance with conventional printing techniques.

In some embodiments, the card processing device 112B is a laminating device that is configured to apply an overlaminate to a surface of the substrate 104 using conventional techniques. In some embodiments, the overlaminate may be in the form in a patch laminate, a thin film laminate, or other conventional overlaminate. In some embodiments, the overlaminate is in the form of a print intermediate, and the laminating device 112B is configured to perform a portion of a transfer printing operation by laminating the print intermediate having an image, which has been printed to the print intermediate using the printing device 112A, to a surface of the substrate 104, in accordance with conventional transfer printing techniques.

Figure 2:
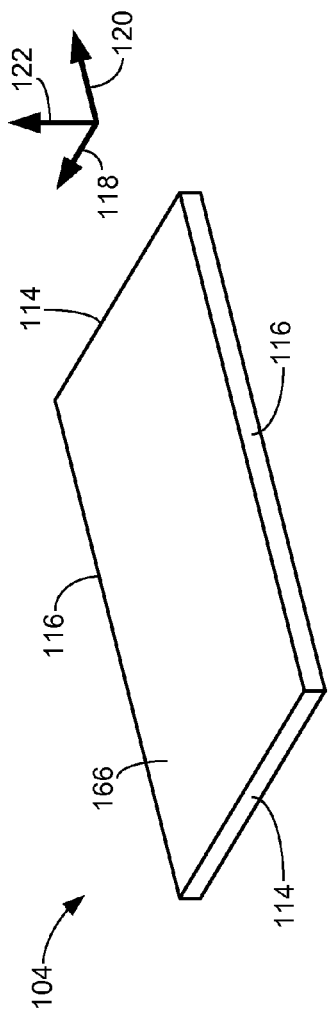
FIG. 2 is a simplified isometric view of an exemplary card substrate 104, in accordance with embodiments of the invention.

FIG. 2 is a simplified isometric view of an exemplary card substrate 104, in accordance with embodiments of the invention. The substrate 104 may take on many different forms, as understood by those skilled in the art. In some embodiments, the substrate 104 is a credential substrate. As used herein the term " credential substrate" includes substrates used to form credentials, such as identification cards, membership cards, proximity cards, drivers licenses, passports, credit and debit cards, and other credentials or similar products. Additional exemplary card substrates 104 include paper substrates other than traditional sheets using copiers or paper sheet printers, plastic substrates, rigid and semi-rigid substrates, and other similar card substrates.

In some embodiments, the card substrate 104 includes opposing edges 114 and opposing edges 116, as shown in FIG. 2. Embodiments of the invention will be described with reference to a coordinate system that is oriented with the substrate 104. In some embodiments, the coordinate system includes an axis 118 that is parallel to the edges 114, and an axis 120 that is parallel to the edges 116. The coordinate system also includes an axis 122 that is perpendicular to the axes 118 and 120.

In some embodiments, the substrate 104 is a rectangular substrate, in which the length of the edges 114 is shorter than the length of the edges 116. Thus, the axis 118 of the coordinate system extends along the width of the substrate 104, the axis 120 extends along the length of the substrate 104, and the axis 112 extends along the thickness of the substrate 104.

As discussed in greater detail below, embodiments of the card substrate rotator 102 are configured to rotate the substrate 104 about a pivot axis 124 between a portrait orientation 126 and a landscape orientation 128 relative to the processing axis 106. The card substrate 104 is in the portrait orientation when the edges 114 are substantially perpendicular to the processing axis 106 and the edges 116 are substantially parallel to the processing axis 106. The card substrate 104 is in the landscape orientation when the edges 114 are substantially parallel to the processing axis 106, and the edges 116 are substantially perpendicular to the processing axis 106.

The rotation of the card substrate 104 between the portrait and landscape orientations using the card rotator 102 may be desirable for various reasons. For example, some of the processing devices 112 may be configured to process the card substrate 104 while the card substrate 104 is in the portrait orientation, while other processing devices 112 are configured to process the card substrate 104 when it is in the landscape orientation. For instance, in some embodiments, the processing device 112A is configured to process individual card substrates 104 when they are in the portrait orientation 126, while the processing device 112B is configured to process individual card substrates 104 when they are in the landscape orientation 128, as indicated in FIG. 1, or vice versa.

Additionally, the card substrate 104 may be discharged from the supply 110, or received through the input with the substrates 104 oriented in either the portrait orientation or landscape orientation relative to the processing axis 106, while at least some of the processing devices require the substrate 104 to be oriented in the other of the portrait and landscape orientations for processing. Furthermore, it may be desirable to discharge the substrates 104 from the device 100 in a different orientation than the orientation in which they are processed. Other needs of the device 100 may also require an adjustment to the orientation of the card substrates 104 relative to the processing path 106 using the card rotator 102.

Figure 3:
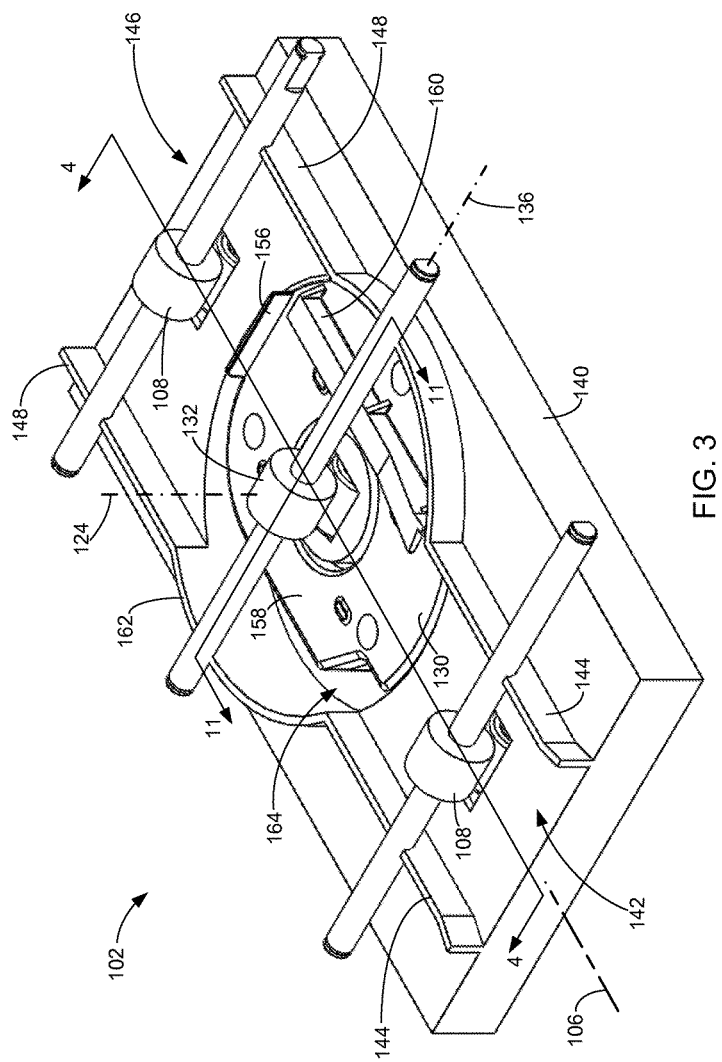
FIG. 3 is an isometric view of an exemplary card rotator in accordance with embodiments of the invention.
Figure 4:
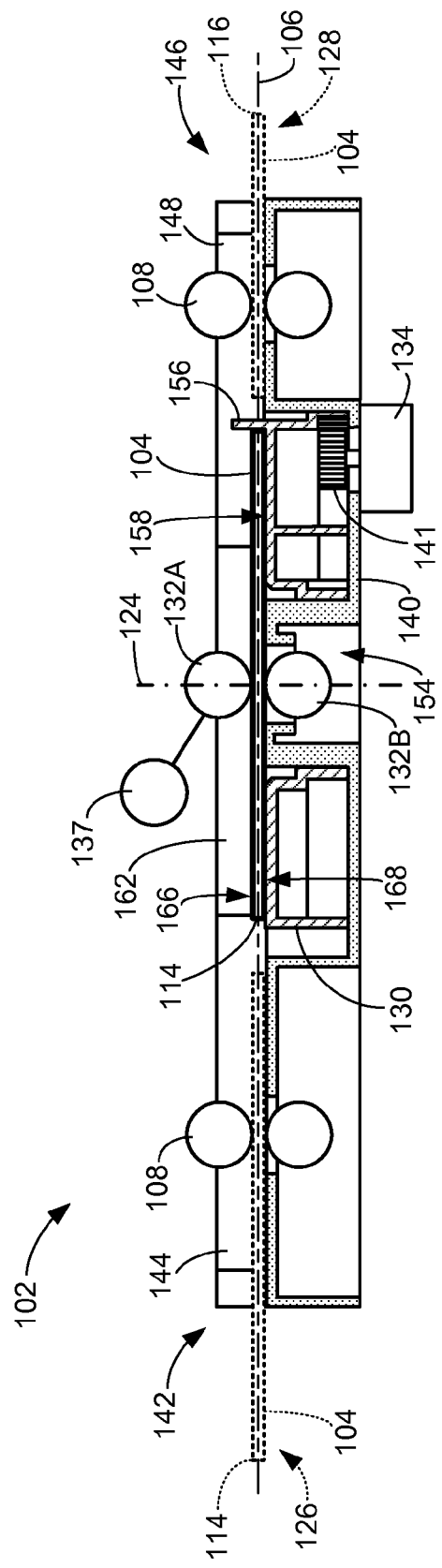
FIG. 4 is a simplified side cross-sectional view of the card rotator of FIG. 3 taken generally along line 4-4, in accordance with exemplary embodiments of the invention.

In some embodiments, the card rotator 102 is configured to rotate the substrate 104 about a pivot axis 124 (FIG. 1) that is approximately parallel to the axis 122 and approximately perpendicular to a plane of the substrate 104 defined by the axes 118 and 120 (FIG. 2), to move the card substrate between the portrait and landscape orientations. Exemplary embodiments of the card rotator are shown in FIGS. 3 and 4. FIG. 3 is an isometric view of an exemplary card rotator 102, in accordance with embodiments of the invention. FIG. 4 is a simplified side cross-sectional view of the card rotator 102 of FIG. 3 taken generally along line 4-4, supporting a card substrate 104.

In some embodiments, the card rotator 102 includes a card receptacle 130, at least one feed roller, which is generally referred to as 132, and a motor 134 (FIG. 4). The card receptacle 130 is configured to support a card substrate 104 (FIG. 4) and rotate about the pivot axis 124, which is approximately perpendicular to the plane of the supported card substrate 104 and the processing axis 106. The feed roller 132 is configured to discharge a card substrate 104 from the card receptacle 130. In some embodiments, the at least one feed roller 132 has an axis of rotation 136 (FIG. 3) that is approximately perpendicular to the pivot axis 124 and the processing axis 106, as shown in FIG. 3. In some embodiments, rotation of the at least one feed roller 132 about its rotational axis 136 is driven by a motor 137, shown schematically in FIG. 4. In some embodiments, the at least one feed roller 132 includes a feed roller 132A and/or a feed roller 132B.

In some embodiments, the card receptacle 130 is supported for rotation about the pivot axis 124 by a frame 140. In some embodiments, the frame 140 has a fixed orientation and position relative to the processing axis 106. In some embodiments, the frame 140 is attached to the frame or housing of the device 100. In some embodiments, the motor 134 is secured to the frame 140. In some embodiments, the frame 140 includes openings to accommodate the feed rollers 108, and the at least one feed roller 132, as shown in FIGS. 3 and 4.

The motor 134 is configured to drive rotation of the card receptacle 130 about the pivot axis 124 relative to the axis of rotation 136 of the one or more feed rollers 132. That is, the feed roller 132 does not rotate about the pivot axis 124 with rotation of the card receptacle 130. In some embodiments, the motor 134 drives rotation of a gear 141 (FIG. 4), which drives rotation of the card receptacle 130 about the pivot axis 124. In some embodiments, the gear 141 directly engages the card receptacle 130, or drives rotation of the card receptacle 130 through a gear train, or other suitable arrangement.

Figure 5:
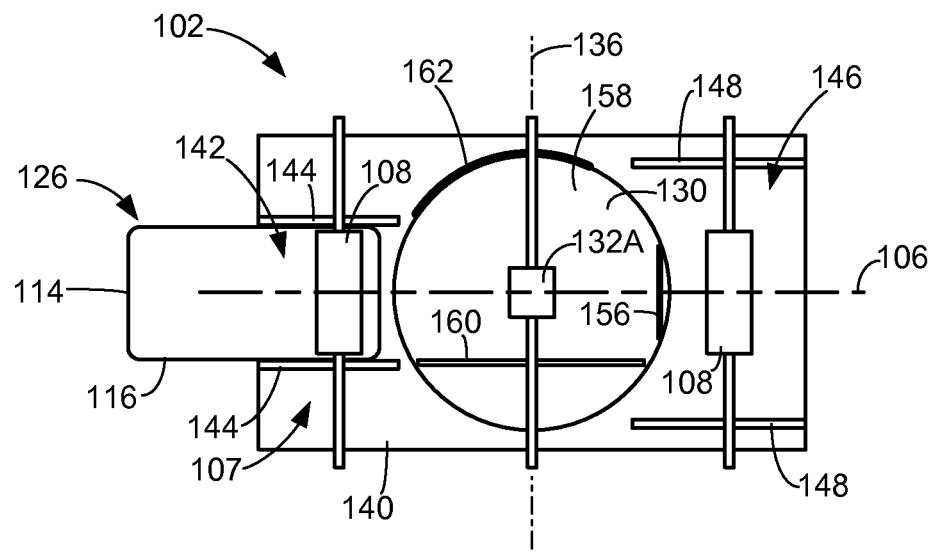
FIGS. 5-9 are simplified top views of an exemplary card rotator during various steps of a card rotation operation, in accordance with embodiments of the invention.

Exemplary embodiments of a card rotation operation performed by the card rotator 102 will be described with reference to FIGS. 5-9, which are simplified top views of an exemplary card rotator 102 during various steps of a card rotation operation, in accordance with embodiments of the invention. In one example, the card substrate 104 is fed along the processing axis 106 toward the card receptacle 130 using the transport mechanism 107 with the substrate 104 in the portrait orientation 126, as shown in FIG. 5, and in phantom lines in FIG. 4. In some embodiments, the card rotator 102 includes a port 142 (FIG. 3) having opposing guide walls 144 that maintain the substrate 104 in the portrait orientation as the substrate 104 is fed toward or away from the card receptacle 130 through the port 142, and along the processing axis 106 using the feed roller 132 and/or the transport mechanism 107.

Figure 6:
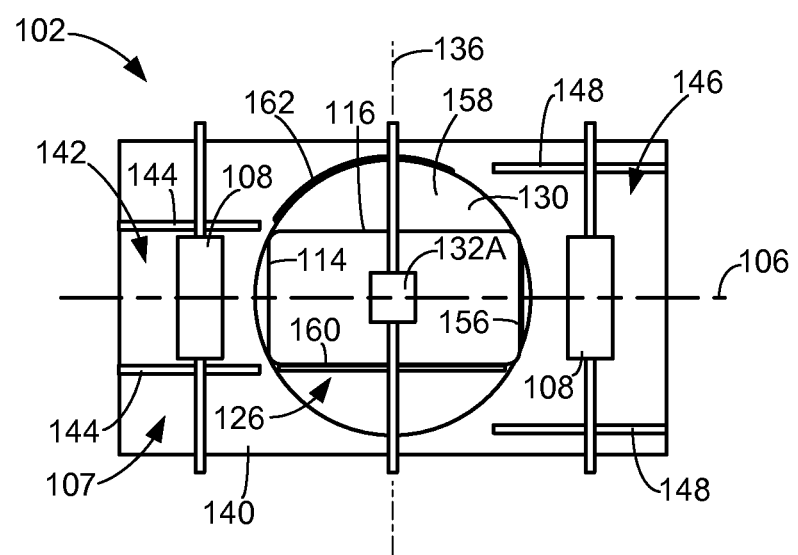

In some embodiments, the card substrate 104 is fed into the card receptacle 130 in the portrait orientation 126, as shown in FIG. 6 and FIG. 4. In some embodiments, the pivot axis 124 extends through the card substrate 104 that is received or supported in the card receptacle 130, as shown in FIG. 4. In some embodiments, the at least one feed roller 132 is driven by the motor 137 to rotate about the axis 136 and drive the card substrate 104 into the card receptacle 130.

Figure 7:
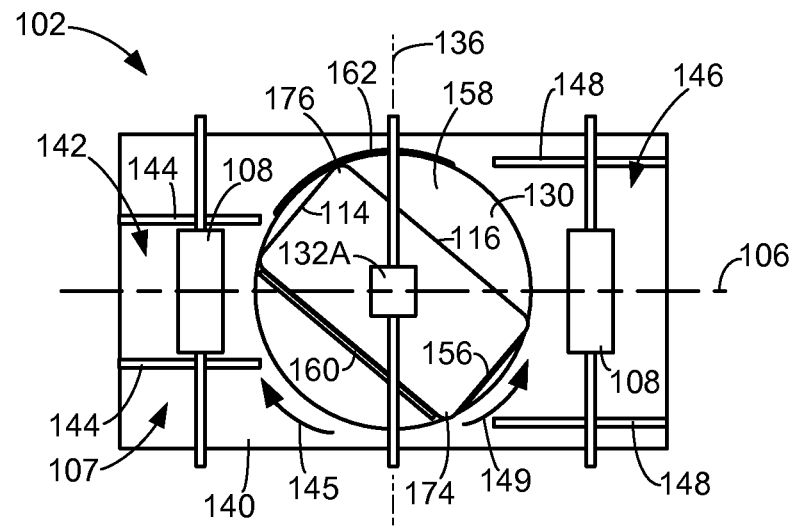

Once the substrate 104 is received by the receptacle 130, the motor 134 drives rotation of the card receptacle 130 about the pivot axis 124 relative to the frame 140 and the axis of rotation 136 of the feed roller 132, as indicated by arrow 145 in FIG. 7. In some embodiments, this rotation of the card substrate 104 maintains the plane of the card substrate 104 substantially parallel to the plane of the card substrate 104 when the card substrate 104 was initially received by the card receptacle (FIG. 6).

Figure 8:
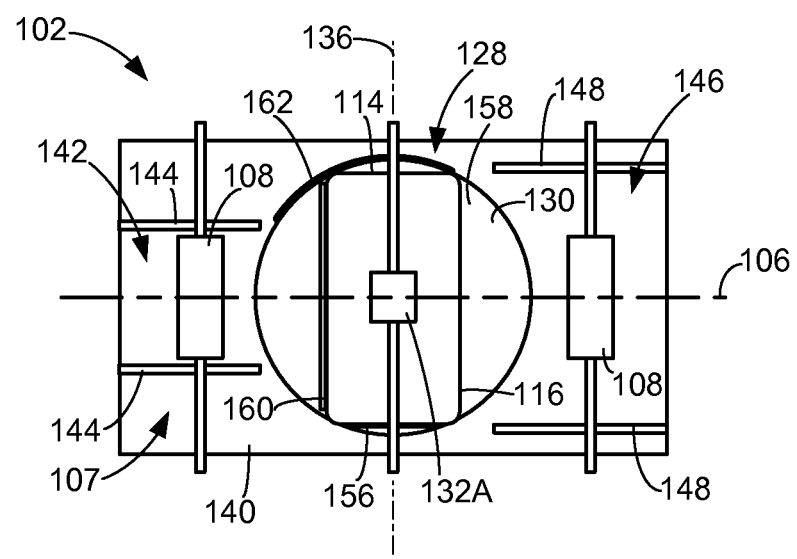

In some embodiments, the card receptacle 130 and the supported substrate 104 rotate 90 degrees relative to the axis of rotation 136 of the feed roller 132 and the frame 140, as shown in FIG. 8, resulting in the card substrate 104 moving from the portrait orientation 126 (FIG. 5) to the landscape orientation 128 (FIG. 8) relative to the processing axis 106.

Figure 9:
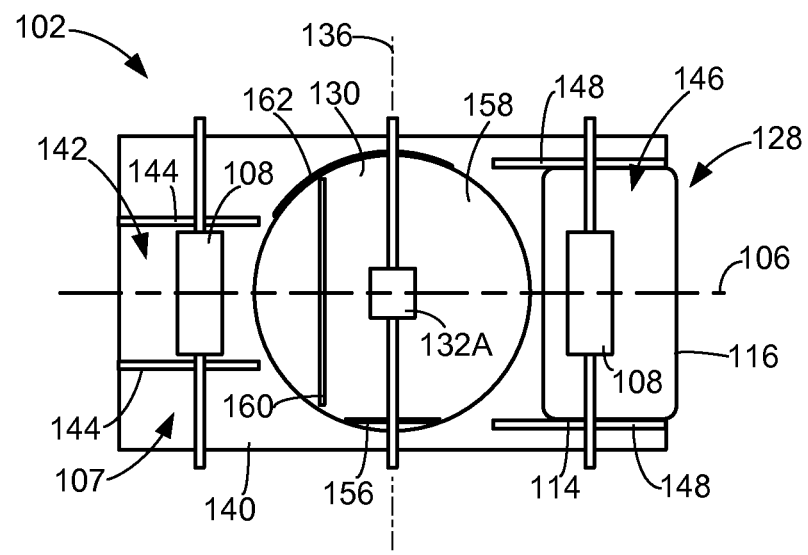

The substrate 104 may then be discharged from the card receptacle 130 along the processing axis 106 by driving rotation of the feed roller 132 about the axis 136 using the motor 137 while the card substrate 104 is in the landscape orientation 128, as shown in FIG. 9, and in phantom lines in FIG. 4. In some embodiments, the card rotator 102 includes a port 146 (FIG. 3) having opposing guide walls 148 that maintain the substrate 104 in the landscape orientation 128 as the card substrate 104 is fed toward or away from the card receptacle 130 through the port 146, and along the processing axis 106 using the feed roller 132 and/or the transport mechanism 107.

The card rotator 102 may also be used to rotate a substrate 104 from the landscape orientation (FIG. 9) to the portrait orientation (FIG. 5) by generally reversing the method steps described above. For instance, the substrate 104 may be fed along the processing axis toward the card receptacle 130 using the transport mechanism 107 (e.g., feed roller 108) while the substrate 104 is in the landscape orientation 128, as shown in FIG. 9. In some embodiments, this feeding of the card substrate 104 includes feeding the substrate 104 through the port 146 (FIG. 3). The card substrate 104 may then be received by the card receptacle 130 while in the landscape orientation 128, as shown in FIG. 8.

The card receptacle 130 is then rotated about the pivot axis 124, as indicated by arrow 149 in FIG. 7. In some embodiments, this rotation of the card substrate 104 maintains the plane of the card substrate 104 substantially parallel to the plane of the card substrate 104 when the card substrate 104 was initially received by the card receptacle (FIG. 8). In some embodiments, the card receptacle 130 and the supported card substrate 104 are rotated 90 degrees to place the card substrate 104 in the portrait orientation 126 (FIG. 6). The substrate 104 may then be discharged from the card receptacle 130 and through the port 142 using the motorized feed roller 132 for feeding along the processing path 106 by the transport mechanism 107, as shown in FIG. 5.

Figure 10:
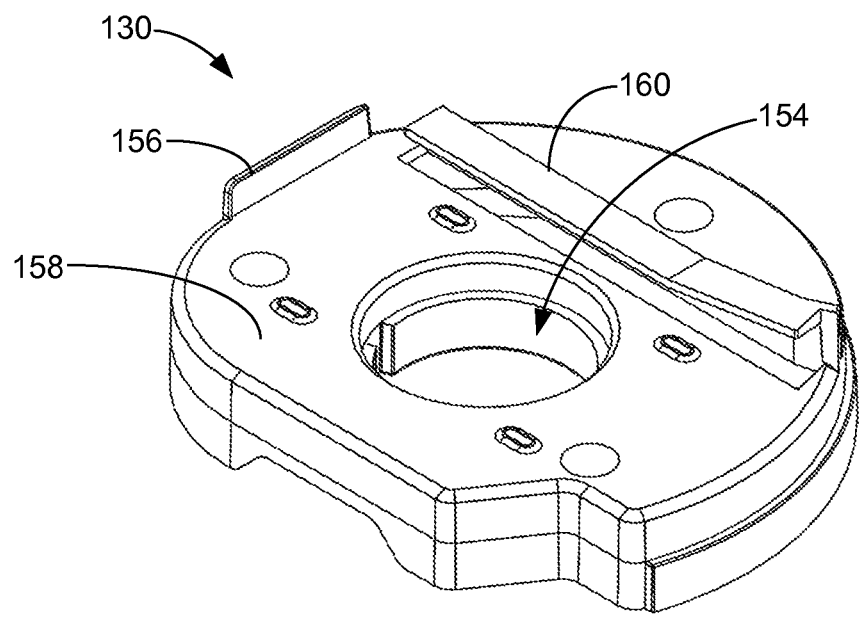
FIG. 10 is an isometric view of an exemplary card receptacle in accordance with embodiments of the invention.

FIG. 10 is an isometric view of an exemplary card receptacle 130 in accordance with embodiments of the invention. In some embodiments, the card receptacle includes an opening 154, through which the feed roller 132B extends to engage a card substrate 104 supported by the card receptacle 130, as shown in FIG. 4. In some embodiments, the card receptacle 130 includes a stop 156 that projects above a support surface 158 of the card receptacle, and a stop 160 that projects above the support surface 158. In some embodiments, the stops 156 and 160 are orthogonal to each other, and generally form an L-shaped cradle for the substrate 104. In some embodiments, the card receptacle 130 is oriented relative to the frame 140 and the processing axis 106 with the stop 156 oriented approximately perpendicularly to the processing axis 106 to receive a card substrate 104 in the portrait orientation 126, as shown in FIGS. 4 and 5. In some embodiments, the card receptacle 130 is oriented relative to the frame 140 and the processing axis 106 with the stop 160 oriented approximately perpendicularly to the processing axis 106 to receive a card substrate 104 in the landscape orientation 128, as shown in FIG. 9.

In some embodiments, when the card substrate 104 is in the portrait orientation 126 (FIG. 5), the feed roller 132 is configured to drive the substrate 104 along the processing axis 106 and the leading edge 114 against the stop 156 to ensure that the substrate 104 is fully received within the card receptacle 130. Likewise, when the substrate 104 is fed into the card receptacle 130 while in the landscape orientation 128 (FIGS. 8 and 9), the feed roller 132 can be used to drive the leading edge 116 of the substrate 104 against the stop 160 to ensure that the card substrate 104 is fully received by the card receptacle 130. In some embodiments, a sensor, such as an optical or physical sensor, is used by the controller 101 to detect when the leading edge 114 engages the stop 156 (FIG. 6), or when the leading edge 116 engages the stop 160 (FIG. 8), and triggers the deactivation of the feed roller 136 to complete the reception of the card substrate 104 within the card receptacle 130.

In some embodiments, during rotation of the card receptacle 130 about the pivot axis 124 relative to the axis of rotation 136 of the feed roller 132 and the frame 140 (FIG. 7), the stops 156 and 160 operate to maintain the position of the substrate 104 relative to the receptacle 130. In some embodiments, the frame or body 140 of the card rotator 102 includes a containment wall 162 extending around at least a portion of an opening 164 of the frame 140, in which the card receptacle 130 is received, as shown in FIG. 3. In some embodiments, the containment wall 162 assists the stops 156 and 160 in maintaining an orientation of the substrate 104 relative to the receptacle 130 during rotation of the receptacle 130 about the pivot axis 124.

In some embodiments, the edges 114 and 116 of the card substrate 104 that respectively engage the stops 156 and 160 while the substrate 104 is supported by the card receptacle 130, converge at a first corner 174 of the card substrate 104, as shown in FIG. 7. In some embodiments, the containment wall 162 engages a second corner 176 of the card substrate 104 supported by the card receptacle 130 that is non-adjacent to, or located diagonally from, the first corner 174, during rotation of the card receptacle 130 about the pivot axis 124 relative to the feed roller 132 and the containment wall 162, as shown in FIG. 7. This engagement of the card substrate 104 by the stops 156 and 160, and the containment wall 162, maintain the card substrate 104 in a generally fixed position and orientation relative to the card receptacle 130 during rotation of the card receptacle 130 and the supported card substrate 104 about the pivot axis 124 relative to the axis of rotation 136 and the containment wall 162.

The at least one feed roller 132 may take on many different forms. In some embodiments, the at least one feed roller 132 includes at least one motorized feed roller that is driven by the motor 137 for rotation about the axis 136, as discussed above. As mentioned above, in some embodiments, the at least one feed roller 132 includes a feed roller 132A that is located above the surface 158 of the card receptacle 130 and is configured to engage a top surface 166 of a card substrate 104 that is received in the card receptacle 130, as shown in FIG. 4. In some embodiments, the feed roller 132 includes a feed roller 132B that is located below the surface 158 of the card receptacle 130, and is configured to engage a bottom surface 168 of a substrate 104 received in the card receptacle 130, as shown in FIG. 4. In some embodiments, the at least one feed roller 132 includes both the feed rollers 132A and 132B in the form of a pinch roller pair, and at least one of the feed rollers 132A or 132B is driven by the motor 137.

In some embodiments, the at least one feed roller 132 of the card rotator 102 includes one or more non-motorized rolling elements that are supported by the frame 140 and/or the card receptacle 130, such as on or within the surface 158 of the card receptacle 130. In some embodiments, the rolling elements may be rollers, or rolling balls. In some embodiments, when such rolling elements are supported by the card receptacle 130, the rolling elements rotate with the card receptacle about the pivot axis 124. In one exemplary embodiment, multiple rolling balls are mounted on the surface 158. In another exemplary embodiment, the lower roller 132B (FIGS. 3 and 4) is a non-motorized free rolling roller. In one embodiment, the roller 132B is mounted on the frame 140 and remains oriented perpendicularly to the processing path 106 and does not rotate with the card receptacle about the pivot axis 124.

In some embodiments, the at least one feed roller 132 is located within a projection of the card receptacle 130 along the pivot axis 124, as shown in FIG. 4. That is, if one were to move the card receptacle in its orientation shown in FIG. 4 along the pivot axis 124, it would encounter the feed roller 132.

Figure 11:
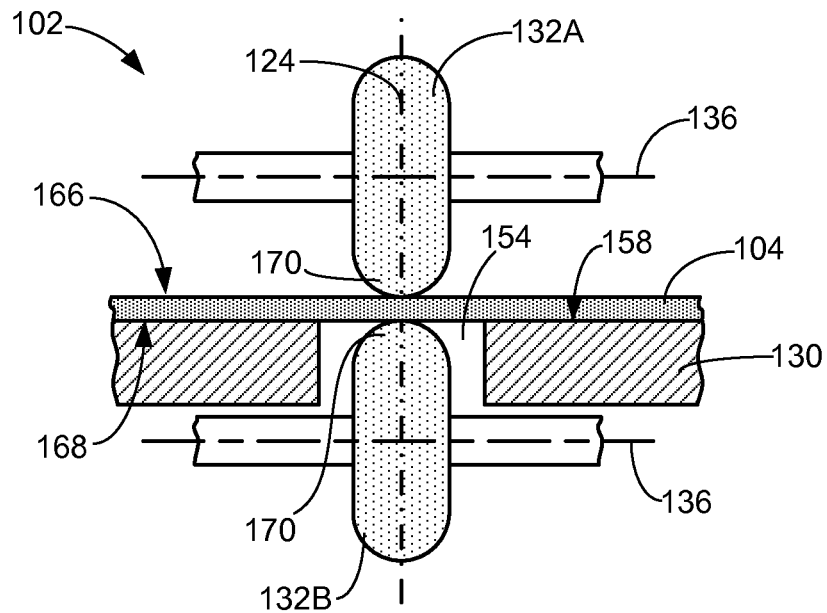
FIG. 11 is a simplified front view of a portion of the card rotator of FIG. 3 taken generally along line 11-11 during a rotation operation, in accordance with embodiments of the invention.

FIG. 11 is a simplified front view of a portion of the card rotator 102 taken generally along line 11-11 of FIG. 3 during rotation (FIG. 7) of the card receptacle 130 and the supported card substrate 104 relative to at least one feed roller 132 and its axis of rotation 136, in accordance with embodiments of the invention. In some embodiments, the feed roller 132 engages the substrate 104 during rotation (FIG. 7) of the card receptacle 130 and the substrate 104 about the pivot axis 124 relative to the feed roller 132 and its axis of rotation 136, as shown in FIG. 11. For example, during rotation of the card receptacle 130 and the card substrate 104 about the axis 124, the feed roller 132A engages the surface 166 of the card substrate 104, and/or the feed roller 132B engages the surface 168 of the card substrate 104, as shown in FIG. 11. Thus, in some embodiments, at least one feed roller 132 remains in contact with a surface of the substrate 104 during the rotation operation. In some embodiments, the at least one feed roller 132 includes both feed rollers 132A and 132B, which respectively engage the surfaces 166 and 168 of the card substrate 104 during the rotation operation performed by the card rotator 102, as shown in FIG. 11. In some embodiments, the card substrate 104 is pinched between the feed rollers 132A and 132B during the card rotation operation.

In some embodiments, the at least one feed roller 132 includes a circumferential portion 170 that contacts the substrate 104 during the rotation operation performed by the card rotator 102. In some embodiments, this circumferential portion 170 has a tapered cross section, which results in a reduced area of contact between the at least one feed roller 132 and the corresponding surface 166 or 168 of the card substrate 104 during the card rotation operation, as compared to when the at least one feed roller 132 has a flat contact surface.

Figure 12:
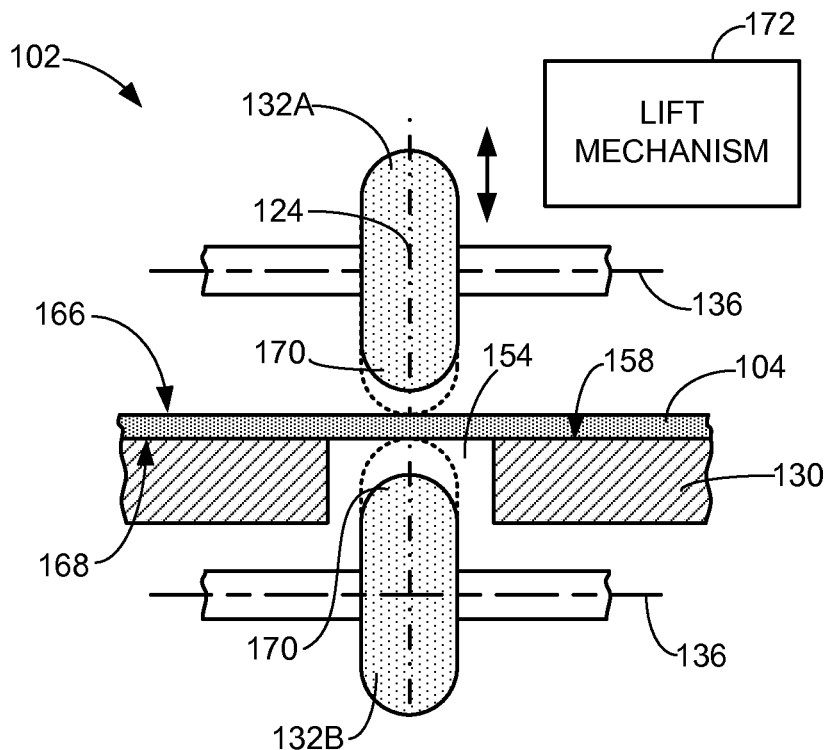
FIG. 12 is a simplified front view of a portion of the card rotator of FIG. 3 taken generally along line 11-11 during a rotation operation, in accordance with embodiments of the invention.

FIG. 12 is a simplified front view of a portion of the card rotator 102 taken generally along line 11-11 of FIG. 3 during a card rotation operation (FIG. 7), in accordance with embodiments of the invention. In some embodiments, components of the card rotator 102 that engage the card substrate 104 do not move relative to the card substrate 104 during the card rotation operation. In some embodiments, the at least one feed roller 132 is displaced from the substrate 104 along the pivot axis 124 such that the at least one feed roller 132 does not engage the card substrate 104 during the card rotation operation. Thus, in some embodiments, a lift mechanism 172 may be utilized to displace the at least one feed roller 132, such as feed rollers 132A and/or 132B, from the card substrate 104 along the pivot axis 124 during the card rotation operation, as indicated in FIG. 12. When it is desired to receive the card substrate 104 in the card receptacle 130, or discharge the card substrate 104 from the card receptacle 130, the lift mechanism 172 moves the at least one feed roller 132 relative to the card receptacle 130 back into engagement with the card substrate 104, such that rotation of the feed roller 132 about the axis 136 drives the card substrate 104 in the desired direction relative to the card receptacle 130.

In some embodiments, the lift mechanism 172 moves the at least one feed roller 132 along the axis 124 relative to the processing axis 106 and the card receptacle 130 to engage or disengage the at least one feed roller from the supported card substrate 104. Alternatively, in some embodiments, the lift mechanism 172 moves the card receptacle 130 along the axis 124 relative to the processing axis 106 and the upper roller 132A to engage or disengage the upper roller 132A from the supported card substrate 104. In such a configuration, the lower roller 132B moves with the with the card receptacle 130.

Figure 13:
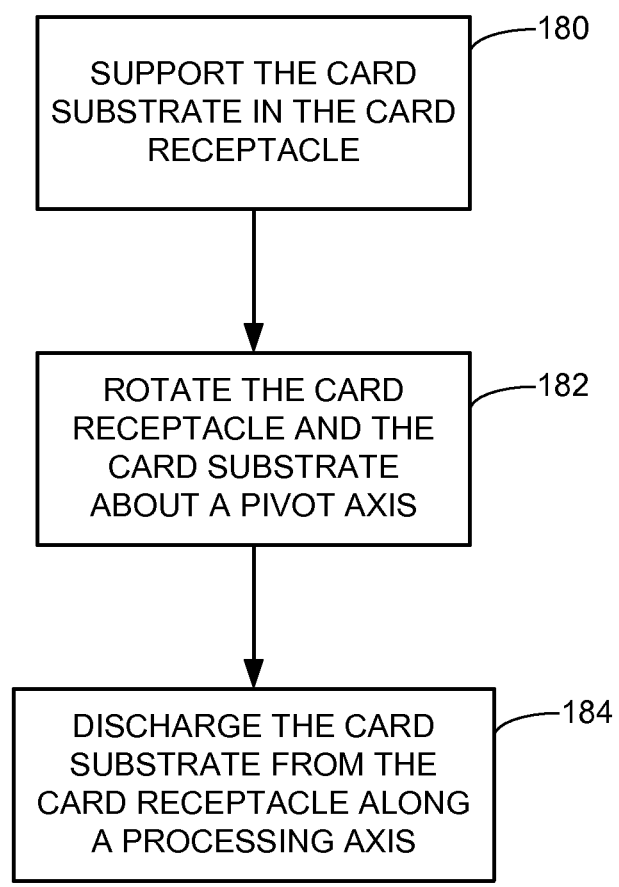
FIG. 13 is a flowchart of a method of rotating a card substrate using a card rotator formed in accordance with embodiments of the invention.

FIG. 13 is a flowchart of a method of rotating a card substrate 104 using a card rotator 102 formed in accordance with one or more embodiments described herein. At 180, the card substrate 104 is supported in the card receptacle 130 (FIGS. 4, 6 and 8). In some embodiments, step 180 comprises feeding the card substrate 104 along the processing axis 106, which is approximately perpendicular to the pivot axis 124 and the axis of rotation 136 of the feed roller 132, and also parallel to the plane of the card substrate defined by the axes 118 and 120 (FIG. 2), and feeding the card substrate 104 through a first port, such as port 142 or port 146 of the card rotator 102, and into the card receptacle 130, as discussed above with regard to FIGS. 5-6 and FIGS. 8-9. In some embodiments, the card substrate 104 is fed into the card receptacle 130 using the at least one feed roller 132, such as feed roller 132A and/or feed roller 132B. In some embodiments, this feeding of the card substrate 104 has the card substrate 104 oriented in either the portrait orientation 126 (FIGS. 5 and 6) or the landscape orientation 128 (FIGS. 8 and 9).

At step 182, the card receptacle 130 and the supported card substrate 104 are rotated about the pivot axis 124, as discussed above with reference to FIG. 7. In some embodiments, this rotation of the card receptacle 130 and the card substrate 104 is made relative to the at least one feed roller 132 and its axis of rotation 136. That is, the at least one feed roller 132 remains in a fixed angular position about the axis 124 relative to the frame 140 of the card rotator 102 or a frame of the device 100, while the card receptacle 130 and the card substrate 104 rotate about the pivot axis 124 relative to the frame 140 of the card rotator 102 or a frame of the device 100. In some embodiments, the card rotation operation 182 involves rotating the card receptacle 130 and the supported card substrate 104 90 degrees about the pivot axis 124 relative to the at least one feed roller 132 and its axis of rotation 136. In some embodiments, this 90 degree rotation of the card substrate 104 transitions the card substrate 104 from its initial portrait or landscape orientation to the other of the portrait or landscape orientation. Thus, when the card substrate 104 is received by the card receptacle 130 in the portrait orientation 126 (FIG. 6) the card rotation operation 182 (FIG. 7) results in the card substrate 104 being in the landscape orientation 128 (FIG. 8) relative to the processing axis 106. When the card substrate 104 is received by the card receptacle 130 in the landscape orientation 128 (FIG. 8), the card rotation operation 182 (FIG. 7) transitions the card substrate 104 to the portrait orientation 126 (FIG. 6) relative to the processing axis 106.

In some embodiments, the at least one feed roller 132 remains in contact with a surface of the card substrate 104 during the rotation operation 182. Thus, in some embodiments, a feed roller 132A engages the surface 166 of the card substrate 104, and/or a feed roller 132B engages the surface 168 of the card substrate 104 during the rotation operation 182, as shown in FIG. 11. In some embodiments, the at least one feed roller 132 is displaced from the card substrate 104 along the pivot axis 124 during the card rotation operation 182, as shown in FIG. 12. Thus, in some embodiments, the feed roller 132A and/or the feed roller 132B is displaced from the card substrate 104 such that it does not contact the card substrate 104 during the card rotation operation 182. In some embodiments, this displacement of the at least one feed roller 132 is facilitated using at least one lift mechanism 172 (FIG. 12).

At 184, the card substrate 104 is discharged from the card receptacle 130 along the processing axis 106 using the at least one feed roller 132. In some embodiments, the at least one feed roller 132 includes the feed roller 132A and/or the feed roller 132B, at least one of which is driven to rotate about its axis 136 using a motor 137 (FIG. 4) to drive the card substrate 104 from the card receptacle 130 along the processing axis, as discussed above with regard to FIGS. 5 and 9.

Although the present invention has been described with reference to preferred embodiments, workers skilled in the art will recognize that changes may be made in form and detail without departing from the spirit and scope of the invention. As used herein, stated relationships, such as "perpendicular," "orthogonal," "parallel," for example, including those recited with an adverb, such as "substantially" or "approximately," are intended to include a reasonable tolerance around the stated relationship, unless specified otherwise. For example, when a component is stated as being perpendicular or parallel to another component, or approximately or substantially perpendicular or parallel to another component, it is understood that terms allow for a reasonable tolerance, such as a 1-5% offset, from the stated relationship.

COPYRIGHT AND LEGAL NOTICES

A portion of the disclosure of this patent document contains material which is subject to copyright protection in the United States. The copyright owner has no objection to the facsimile reproduction by anyone of the patent document or the patent disclosure, as it appears in the Patent and Trademark Office patent files or records, but otherwise reserves all copyrights whatsoever.

What is claimed is:

1. A card rotator comprising:
a card receptacle configured to rotate about a pivot axis that is approximately perpendicular to a plane of a card substrate supported by the card receptacle;
a feed roller configured to discharge a card substrate from the card receptacle, and having an axis of rotation that is approximately perpendicular to the pivot axis;
a motor configured to drive rotation of the card receptacle about the pivot axis relative to the axis of rotation of the feed roller; and
wherein;
the feed roller is within a projection of the card receptacle along the pivot axis; and
the feed roller does not rotate about the pivot axis with rotation of the card receptable about the pivot axis.

2. The card rotator of claim 1, wherein the feed roller is positioned above or below the card receptacle.

3. The card rotator of claim 1, wherein the pivot axis extends through a card substrate supported in the card receptacle.

4. The card rotator according to claim 1, wherein the feed roller engages a card substrate supported in the card receptacle during rotation of the card receptacle and the card substrate about the pivot axis.

5. The card rotator according to claim 4, wherein the feed roller comprises a circumferential portion configured to contact a substrate supported by the card receptacle and having a tapered cross section.

6. The card rotator according to claim 1, wherein the feed roller is displaced from a card substrate supported in the card receptacle during rotation of the card receptacle and the card substrate about the pivot axis.

7. The card rotator of claim 1, wherein:
the feed roller is configured to discharge a card substrate from the card receptacle along a processing axis;
the axis of rotation of the feed roller is approximately orthogonal to the pivot axis and the processing axis; and
the processing axis is approximately parallel to the plane of a card substrate supported by the card receptacle.

8. The card rotator according to claim 7, wherein the card receptacle comprises:
a first stop; and
a second stop, which is orthogonal to the first stop;
wherein:
the first stop engages a first edge of a card substrate supported by the card receptacle; and
the second stop engages a second edge of the card substrate supported by the card receptacle.

9. The card rotator according to claim 8, wherein the first and second stops form an L-shaped cradle.

10. The card rotator according to claim 8, wherein:
the card rotator comprises first and second ports, which are located along the processing axis on opposing sides of the card receptable; and
the feed roller is configured to drive a card substrate received through the first port against the first stop, and the feed roller is configured to drive a card substrate received through the second port against the second stop.

11. The card rotator according to claim 8, further comprising a containment wall, wherein the containment wall engages the card substrate supported by the card receptacle during rotation of the card receptacle about the pivot axis relative to the feed roller and the containment wall.

12. The card rotator according to claim 11, wherein:
the first and second edges of the substrate converge at a first corner of the card substrate supported by the card receptacle; and
the containment wall engages a second corner of the card substrate supported by the card receptacle that is non-adjacent to the first corner during rotation of the card receptacle about the pivot axis relative to the feed roller and the containment wall.

13. The card rotator according to claim 7, wherein:
the card rotator comprises first and second ports, which are located along the processing axis on opposing sides of the card receptacle;
the feed roller is positioned between the first and second ports;
a card substrate is fed into the card receptacle from the first port, or discharged from the card receptacle through the first port, in a first orientation; and
a card substrate is fed into the card receptacle from the second port, or discharged from the card receptacle through the second port, in a second orientation, which is different than the first orientation.

14. The card rotator according to claim 13, wherein:
the first port comprises opposing guide walls that maintain a card substrate in the first orientation during feeding of the card substrate through the first port;
the second port comprises opposing guide walls that maintain a card substrate in the second orientation during feeding of the card substrate through the second port; and
a distance separating the opposing guide walls of the first port is different than a distance separating the opposing guide walls of the second port.

15. A method of rotating a card substrate using a card rotator that includes a card receptacle, a feed roller, and a motor, the method comprising:
supporting the card substrate in the card receptacle;
rotating the card receptacle and the card substrate about a pivot axis relative to an axis of rotation of the feed roller using the motor, wherein the pivot axis is approximately perpendicular to the axis of rotation and a plane of the card substrate; and
discharging the card substrate from the card receptacle along a processing axis using the feed roller;
wherein;
the feed roller is within a projection of the card receptacle along the pivot axis; and
the feed roller does not rotate about the pivot axis during rotating the card receptable and the card substrate about the pivot axis.

16. The method according to claim 15, further comprising engaging the card substrate with the feed roller during rotating the card receptacle and the card substrate.

17. The method according to claim 15, wherein:
supporting the card substrate in the card receptacle comprises feeding the card substrate along a processing axis, which is approximately perpendicular to the pivot axis and the axis of rotation of the feed roller, and parallel to the plane of the card substrate, through a first port and into the card receptacle while the card substrate is in a first orientation relative to the axis of rotation of the feed roller;
discharging the card substrate comprises discharging the card substrate in a second orientation relative to the axis of rotation along the processing axis through a second port using the feed roller;
the second orientation is different from the first orientation.

18. A credential production device comprising:
a supply of card substrates;
a transport mechanism configured to feed individual substrates from the supply along a processing axis;
a card processing device configured to perform a process on individual card substrates fed along the processing axis; and
a card rotator comprising:
a card receptacle configured to support a card substrate and rotate about a pivot axis that is approximately perpendicular to a plane of the card substrate and the processing axis;
a feed roller configured to discharge a card substrate from the card receptacle, and having an axis of rotation that is approximately perpendicular to the pivot axis and the processing axis; and
a motor configured to drive rotation of the card receptacle about the pivot axis relative to the axis of rotation of the feed roller
wherein:
the feed roller is within a projection of the card receptacle along the pivot axis; and
the feed roller does not rotate about the pivot axis with rotation of the card receptacle about the pivot axis.

19. The device of claim 18, wherein the card processing device comprises one of a printing device configured to print an image and a laminating device configured to apply an overlaminate to a surface of a card substrate.

* * * * *